United States Patent [19]
Purvin et al.

[11] Patent Number: 5,080,546
[45] Date of Patent: Jan. 14, 1992

[54] TWO PIECE CRADLE NUT

[75] Inventors: Glenn S. Purvin, Mt. Clemens, Mich.; Robb M. Fultz, Huntington, Ind.

[73] Assignee: Emhart Inc., Newark, Del.

[21] Appl. No.: 730,660

[22] Filed: Jul. 16, 1991

[51] Int. Cl.⁵ .................... F16B 37/08; F16B 39/24
[52] U.S. Cl. ................................. 411/156; 411/84; 411/432; 411/533
[58] Field of Search ............... 411/84, 85, 155, 156, 411/432, 533, 917, 173, 177, 183

[56] References Cited

U.S. PATENT DOCUMENTS

| | | | |
|---|---|---|---|
| 1,872,616 | 8/1932 | Andren | 411/183 |
| 2,985,213 | 5/1961 | Consandine | 411/183 |
| 4,362,449 | 12/1982 | Hlinsky | 411/156 |
| 4,431,353 | 2/1984 | Capuano | 411/533 |
| 4,784,552 | 11/1988 | ReGentisch | 411/85 |

Primary Examiner—Neill R. Wilson
Attorney, Agent, or Firm—Spencer T. Smith

[57] ABSTRACT

A two piece fastener made up of a hex-on-hex nut and a diamond shaped steel plate with a countersink portion having a hex shaped hole to receive the reduced across flats portion of the hex-on-hex nut. The bottom of the nut sits above the thin metal bearing surface against which the steel plate is being clamped.

3 Claims, 2 Drawing Sheets

TWO PIECE CRADLE NUT

The present invention relates to fastener assemblies, which can distribute high bolt clamping loads across large clearance holes and over a very large surface area and more particularly to fasteners for attaching automotive chassis components to the body.

Current automotive design practice dictates that large rigid components, such as engine cradles and trailing axles must be attached to the thin body sheet metal. It is also common that larger clearance holes must be allowed in the body to accommodated variance in the location and angularity of the bolt pattern. In such attachments, it is common practice to insert the bolts through the rigid structure and mate them with the nuts floating within steel retainers in the body. This design requires that the nut be able to produce and distribute high bolt clamp loads over a large area of the thin body sheet metal.

The presently preferred nut is an extruded nut formed from low carbon steel plate. This nut features a tall threaded barrel section extruded from flat plate. Difficulties have been encountered when making attachments with this type of nut:

1. As bodies go through the primer bath, the flat surface of the nut tends to adhere in the primer and thus is not easily broken free to float over the clearance hole in the body;

2. The high clamp load requirements in todays automobiles dictate that the extruded nuts have long thread engagement lengths and roll formed threads to prevent stripping in the low carbon material. Roll formed threads are easily cross threaded when bolt angularity is present and long thread engagement lengths cause undesirable variation in the relationship between torque applied to the bolts and tension produced in the joint and;

3. Nuts extruded from low carbon plate tend to draw back against the direction of extrusion when high loads are applied over large clearance holes. This causes pinching of the bolt threads which produces undesirable variation in torque/tension relationship.

It is, accordingly, an object of the present invention to provide a fastener assembly capable of both carrying and distributing high clamping loads effectively.

It is also an object of the present invention to reduce the contact area between the fastener assembly and the body surface to reduce the surface area of the fastener assembly which can be bonded to the body during the priming operation. This will make the nut plate easier to break free from the primer to float in the retainer.

A further object of the present invention is to use threads which are cut tapped after heat treatment. Hardened, cut tapped threads resist cross threading during assembly and also allow a shorter length of thread engagement. The shorter thread engagement length minimizes variation in the amount of tension produced by application of a specified torque to the bolt in the joint.

Another object of the present invention is to reduce fastener weight and cost per vehicle.

Another object of the present invention is to provide a fastener assembly which can distribute the clamp load farther from the hole.

Other objectives and advantages of the present invention will become apparent from the following portion of the specification and from the following drawings, which illustrate in accordance with the mandate of the patent statutes, a presently preferred embodiment incorporating the principles of the invention.

Referring to the drawings.

Figure 1:
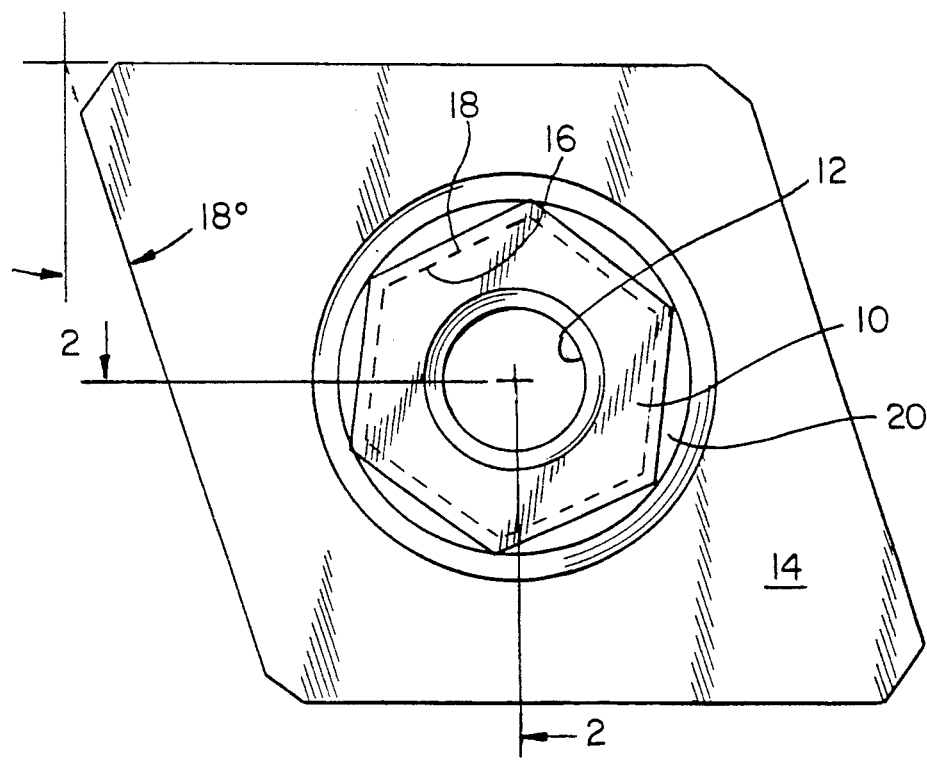
FIG. 1 is a top view of the fastener assembly made in accordance with the teachings of the present invention.
Figure 2:
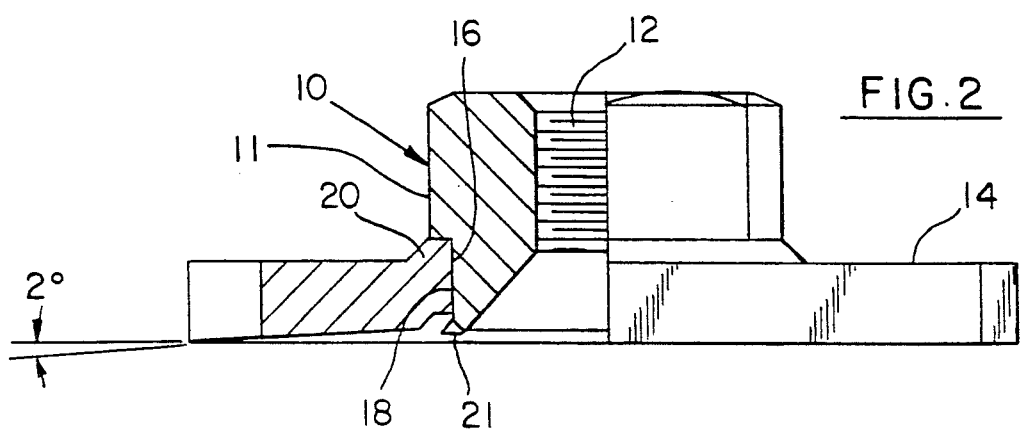
FIG. 2 is a view, partly in section of the fastener assembly taken at 2—2 of FIG. 1.
Figure 3:
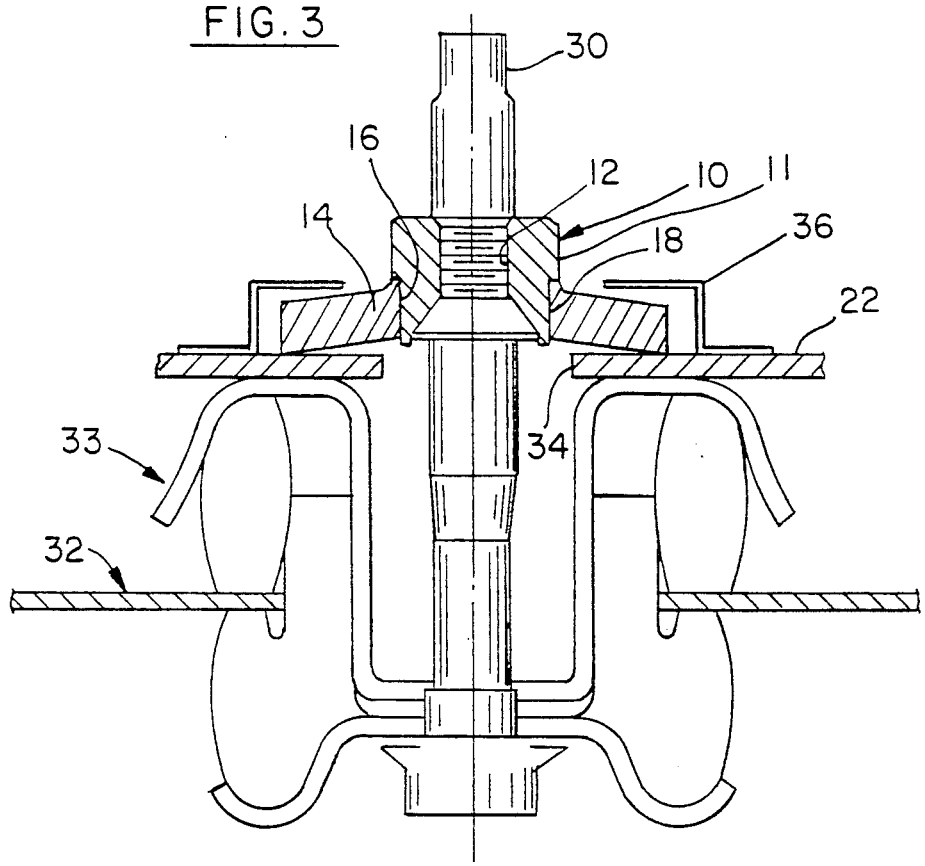
FIG. 3 is an elevational view of an engine cradle secured by the fastener assembly illustrated in FIGS. 1 and 2.

The fastener assembly is made up of a hex-on-hex clinching nut 10 (a nut having a hex shaped head 11 and a smaller hex shaped body 18) which is made from medium carbon steel (1035 steel, 28–32 Rc, for example) and which is heat treated before the threads 12 are cut into the nut and a medium carbon, heat treated, diamond shape steel nut plate 14. A hex configuration, having six sides results in three pairs of parallel side surfaces. The body 18 being smaller than the head 11, it will have a smaller dimension between opposed parallel surfaces ("across flats") than the dimension "across flats" on the head 11. This plate is slightly conical with the bottom surface tapering at an angle of 2° at any location toward the center of the plate. The center of the plate has a hexagonal hole 16 for receiving the smaller lower inset hexagonal portion 18 of the hex-on-hex clinching nut (the inner across flats dimension of the hex hole 16 corresponds to the outer across flats dimension of the body hex hole 18 of the hex-on-hex nut 10) and the central portion 20 of the plate is punched upwardly a selected amount to raise the bottom 21 of the hex-on-hex nut to a position where it will not engage the thin sheet metal bearing surface (body rail section) 22 when subjected to the desired clamp load. As can be seen from FIG. 2, the corners of the nut are aligned with the long axis of the plate. To permanently associate the two pieces the nut is solidly clinched by expanding the protruding bottom portion of the small hex portion with a slightly convex punch and a large force.

In use, a mounting bolt 30 which supports an engine cradle 32 via the cradle mount assembly 33, is inserted through a large hole 34 in the thin metal body rail section 22 and into the hex-on-hex nut 10 with the top most thread of the mounting bolt engaging the lowermost thread 12 of the hex-on-hex nut 10 (the fastener assembly is located by a steel retainer 36). A predetermined amount of torque will then be applied to the bolt, drawing the nut plate towards the thin metal bearing surface of the body rail section creating the required clamp load in the joint (bolt is in tension and joint is in compression).

Figure 5:
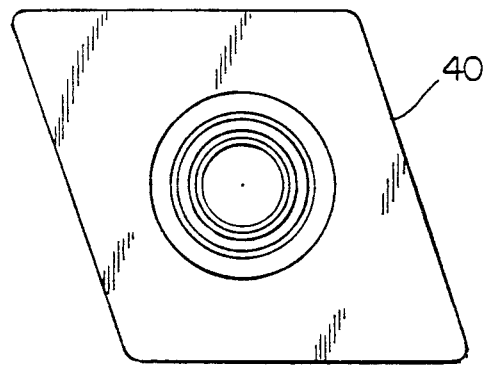
FIG. 5 is a top view of the prior art fastener illustrated in FIG. 4.
Figure 4:
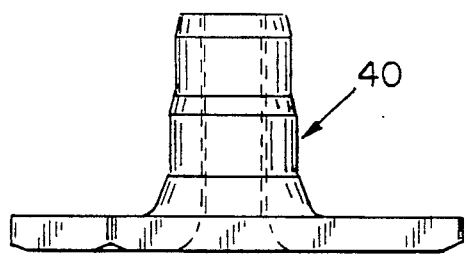
FIG. 4 is a view similar to that of FIG. 2 illustrating the prior art fastener.

FIGS. 4 and 5 illustrate the prior art one piece fastener 40 which is an extruded nut formed from low carbon steel plate. In such an extruded nut, the threads are rolled in low carbon steel and as a result the threaded length has to be substantially greater to prevent stripping.

We claim:

1. A two piece fastener assembly comprising
   a hex-on-hex clinching nut having an upper hex portion and a lower reduced across flats hex portion,
   a slightly concave diamond shaped steel plate having a countersink central portion with a hex hole therethrough for receiving said lower reduced across flats hex portion of said hex-on-hex clinching nut, said hex-on-hex clinching nut supported by the countersink portion and the lower portion of said hex-on-hex nut being sized so that when so supported the bottom of said lower portion will be a selected distance above the surface against which said steel plate is to be engaged, said bottom of said lower reduced across flats hex portion being selectively expanded radially outwardly beyond the inner across flats of said plate hex hole.

2. A two piece fastener assembly according to claim 1, wherein said hex-on-hex clinching nut is made from medium carbon steel and is heat treated prior to the threads being cut.

3. A two piece fastener assembly according to claim 2, wherein said plate is made from heat treated medium carbon steel.

* * * * *